United States Patent
Lei

(10) Patent No.: US 11,919,637 B2
(45) Date of Patent: Mar. 5, 2024

(54) AUTOMATIC RETURN METHOD, APPARATUS AND UNMANNED AERIAL VEHICLE

(71) Applicant: AUTEL ROBOTICS CO., LTD., Guangdong (CN)

(72) Inventor: Xiaogang Lei, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 252 days.

(21) Appl. No.: 17/350,693

(22) Filed: Jun. 17, 2021

(65) Prior Publication Data
US 2021/0309364 A1    Oct. 7, 2021

Related U.S. Application Data

(63) Continuation of application No. PCT/CN2019/126037, filed on Dec. 17, 2019.

(30) Foreign Application Priority Data

Dec. 17, 2018  (CN) .......................... 201811541989.1

(51) Int. Cl.
*B64C 39/02*  (2023.01)
*B60L 58/13*  (2019.01)
(Continued)

(52) U.S. Cl.
CPC ............ *B64C 39/024* (2013.01); *B60L 58/13* (2019.02); *G07C 5/008* (2013.01); *G08G 5/0069* (2013.01);
(Continued)

(58) Field of Classification Search
CPC ....... B64C 39/024; B60L 58/13; G07C 5/008; G08G 5/0069; G08G 5/0091;
(Continued)

(56) References Cited

U.S. PATENT DOCUMENTS

| | | | |
|---|---|---|---|
| 2016/0247404 A1* | 8/2016 | Srivastava | G05D 1/0027 |
| 2017/0263132 A1* | 9/2017 | Butler | G08G 5/0026 |
| 2018/0061247 A1* | 3/2018 | Brown | G08G 5/0069 |

FOREIGN PATENT DOCUMENTS

| | | |
|---|---|---|
| CN | 104166355 A | 11/2014 |
| CN | 104881041 A | 9/2015 |

(Continued)

OTHER PUBLICATIONS

The International Search Report dated Feb. 27, 2020; PCT/CN2019/126037.

(Continued)

*Primary Examiner* — Tyler D Paige

(57) ABSTRACT

Embodiments of the present invention relate to the technical field of unmanned aerial vehicles (UAV), and specifically discloses an automatic return method, device and UAV. By means of the foregoing technical solutions, the embodiments of the present invention can estimate a minimum power consumption required for the UAV to return from the current position to the return point in a more accurate way, so as to avoid forced landing of the UAV due to an excessively low battery level during a flight or a return.

12 Claims, 3 Drawing Sheets

(51) Int. Cl.
  *G07C 5/00* (2006.01)
  *G08G 5/00* (2006.01)
  *B64U 50/19* (2023.01)
(52) U.S. Cl.
  CPC ........... *G08G 5/0091* (2013.01); *B64U 50/19* (2023.01); *B64U 2201/10* (2023.01)
(58) Field of Classification Search
  CPC .. G08G 5/0013; G08G 5/0026; G08G 5/0052; B64U 50/19; B64U 2201/10; B64U 10/13; Y02T 10/70; G05D 1/0808; G05D 1/101
  USPC .......................................................... 701/23
  See application file for complete search history.

(56) References Cited

FOREIGN PATENT DOCUMENTS

| | | |
|---|---|---|
| CN | 105334865 A | 2/2016 |
| CN | 205608520 U | 9/2016 |
| CN | 106647779 A | 5/2017 |
| CN | 107357304 A | 11/2017 |
| CN | 109634295 A | 4/2019 |

OTHER PUBLICATIONS

The First Chinese Office Action dated Jan. 2, 2020; Appln. No. 201811541989.1.

\* cited by examiner

AUTOMATIC RETURN METHOD, APPARATUS AND UNMANNED AERIAL VEHICLE

CROSS REFERENCE

This application is a continuation of International Application No. PCT/CN2019/126037, filed on Dec. 17, 2019, which claims priority to Chinese Patent Application No. 2018115419891 filed on Dec. 17, 2018, which is incorporated herein by reference in its entirety.

BACKGROUND

Technical Field

Embodiments of the present invention relate to the technical field of unmanned aerial vehicles (UAV), and in particular, to an automatic return method, apparatus and UAV.

Related Art

A UAV is an unmanned aircraft using a radio remote control device and a built-in program to control flight attitudes. With the development of social science and technology, the UAV plays a variety of important roles in our lives. The UAV is provided for military use of the country or for entertainment of individuals.

Currently, in order to enable the UAV to return to a return point safely, the UAV is usually triggered to return automatically when the remaining battery level of the UAV is less than or equal to a certain minimum power. The minimum power is usually determined according to a return distance of the UAV, a current flight speed and a current power consumption rate.

However, during implementation of the present invention, the inventor found that: in some cases, the minimum power determined only according to the return distance, the current flight speed and the current power consumption rate is not sufficient to support the safe return of the UAV, which may easily lead to forced landing due to an excessively low battery level of the UAV halfway.

SUMMARY

In view of this, embodiments of the present invention provide an automatic return method, apparatus and UAV, which can solve the problem of forced landing due to an excessively low battery level of the UAV halfway caused by an inaccurate current minimum power for triggering an automatic return of the UAV.

To resolve the foregoing technical problem, the embodiments of the present invention provide the following technical solutions:

In a first aspect, an embodiment of the present invention provides an automatic return method applicable to a UAV, the method including:

obtaining current return information, environmental information and a remaining battery level of the UAV in real time, where the return information includes a return route, a return distance, a return acceleration pedal depression amount and a power consumption rate corresponding to the return acceleration pedal depression amount that are for the UAV to return from a current position to a return point, and the environmental information includes information about a vertical air stream on the return route;

determining, according to the return information and the environmental information, a total power consumption for the UAV to return from the current position to the return point; and controlling the UAV to return automatically when a difference between the remaining battery level and the total power consumption is less than or equal to a battery level threshold.

Optionally, the determining, according to the return information and the environmental information, a total power consumption for the UAV to return from the current position to the return point includes:

determining, according to the return information, a basic power consumption for the UAV to return from the current position to the return point without an influence of the vertical air stream;

determining, according to the information about the vertical air stream on the return route, an additional power consumption for the UAV to return from the current position to the return point; and determining, based on the basic power consumption and the additional power consumption, the total power consumption for the UAV to return from the current position to the return point.

Optionally, the determining, according to the information about the vertical air stream on the return route, an additional power consumption for the UAV to return from the current position to the return point includes:

determining, according to the information about the vertical air stream, whether a vertical air stream region exists on the return route; and if not, determining that the additional power consumption for the UAV to return from the current position to the return point is 0; or if so, determining, according to a range and an air stream strength of the vertical air stream region, the additional power consumption for the UAV to return from the current position to the return point.

Optionally, the return information further includes a return angle, and the environmental information further includes a wind speed and a wind direction of an environment in which the UAV is located; and the determining, according to the return information, a basic power consumption for the UAV to return from the current position to the return point without an influence of the vertical air stream includes:

determining, according to the wind speed, the wind direction and the return information, the basic power consumption for the UAV to return from the current position to the return point without the influence of the vertical air stream.

Optionally, the determining, according to the wind speed, the wind direction and the return information, the basic power consumption for the UAV to return from the current position to the return point without the influence of the vertical air stream includes:

determining, according to the return acceleration pedal depression amount, the return angle, the wind speed and the wind direction, an actual return speed for the UAV to return from the current position to the return point in a windy environment;

determining, according to the actual return speed, the return distance and the power consumption rate corresponding to the return acceleration pedal depression amount, the basic power consumption for the UAV to return from the current position to the return point without the influence of the vertical air stream.

Optionally, the return information further includes a maximum return speed, and the determining, according to the wind speed, the wind direction and the return information, the basic power consumption for the UAV to return from the current position to the return point without the influence of the vertical air stream includes:

determining, according to the return acceleration pedal depression amount, the return angle, the wind speed and the wind direction, an actual return speed for the UAV to return from the current position to the return point in a windy environment;

determining whether the actual return speed is less than or equal to the maximum return speed; and if so, determining, according to the actual return speed, the return distance and the power consumption rate corresponding to the return acceleration pedal depression amount, the basic power consumption for the UAV to return from the current position to the return point without the influence of the vertical air stream; or if not, predetermining the return acceleration pedal depression amount of the UAV according to the maximum return speed, the return angle, the wind speed and the wind direction, and determining, according to the maximum return speed, the return distance and a power consumption rate corresponding to the redetermined return acceleration pedal depression amount of the UAV, the basic power consumption for the UAV to return from the current position to the return point without the influence of the vertical air stream.

Optionally, the battery level threshold is greater than or equal to a minimum power required for the UAV to land.

In a second aspect, an embodiment of the present invention provides an automatic return apparatus applicable to a UAV, the apparatus including:

an information obtaining unit configured to obtain current return information, environmental information and a remaining battery level of the UAV in real time, where the return information includes a return route, a return distance, a return acceleration pedal depression amount and a power consumption rate corresponding to the return acceleration pedal depression amount that are for the UAV to return from a current position to a return point, and the environmental information includes information about a vertical air stream on the return route;

a return power consumption evaluation unit configured to determine, according to the return information and the environmental information, a total power consumption for the UAV to return from the current position to the return point; and an automatic return unit configured to control the UAV to return automatically when a difference between the remaining battery level and the total power consumption is less than or equal to a battery level threshold.

Optionally, the return power consumption evaluation unit includes:

a basic power consumption evaluation module configured to determine, according to the return information, a basic power consumption for the UAV to return from the current position to the return point without an influence of the vertical air stream;

an additional power consumption evaluation module configured to determine, according to the information about the vertical air stream on the return route, an additional power consumption for the UAV to return from the current position to the return point; and a total power consumption evaluation module configured to determine, based on the basic power consumption and the additional power consumption, a total power consumption for the UAV to return from the current position to the return point.

Optionally, the additional power consumption evaluation module is specifically configured to:

determine, according to the information about the vertical air stream, whether a vertical air stream region exists on the return route; and if not, determine that the additional power consumption for the UAV to return from the current position to the return point is 0; or if so, determine, according to a range and an air stream strength of the vertical air stream region, the additional power consumption for the UAV to return from the current position to the return point.

Optionally, the return information further includes a return angle, and the environmental information further includes a wind speed and a wind direction of an environment in which the UAV is located; and the basic power consumption evaluation module is specifically configured to:

determine, according to the wind speed, the wind direction and the return information, the basic power consumption for the UAV to return from the current position to the return point without the influence of the vertical air stream.

Optionally, the basic power consumption evaluation module is specifically configured to:

determine, according to the return acceleration pedal depression amount, the return angle, the wind speed and the wind direction, an actual return speed for the UAV to return from the current position to the return point in a windy environment; and determine, according to the actual return speed, the return distance and the power consumption rate corresponding to the return acceleration pedal depression amount, the basic power consumption for the UAV to return from the current position to the return point without the influence of the vertical air stream.

Optionally, the return information further includes a maximum return speed, and the basic power consumption evaluation module is specifically configured to:

determine, according to the return acceleration pedal depression amount, the return angle, the wind speed and the wind direction, an actual return speed for the UAV to return from the current position to the return point in a windy environment;

determine whether the actual return speed is less than or equal to the maximum return speed; and if so, determine, according to the actual return speed, the return distance and the power consumption rate corresponding to the return acceleration pedal depression amount, the basic power consumption for the UAV to return from the current position to the return point without the influence of the vertical air stream; or if not, predetermine the return acceleration pedal depression amount of the UAV according to the maximum return speed, the return angle, the wind speed and the wind direction, and determine, according to the maximum return speed, the return distance and a power consumption rate corresponding to the redetermined return acceleration pedal depression amount of the UAV, the basic power consumption for the UAV to return from the current position to the return point without the influence of the vertical air stream.

Optionally, the battery level threshold is greater than or equal to a minimum power required for the UAV to land.

In a third aspect, an embodiment of the present invention provides a UAV, including:
a body;
an arm, connected to the body;
a power apparatus disposed on the arm and configured to provide lift force or motive force for the UAV to fly;
at least one processor disposed in the body; and
a memory communicatively connected to the at least one processor, the memory storing instructions executable by the at least one processor, the instructions being executed by the at least one processor, to enable the at least one processor to perform the automatic return method described above.

According to a fourth aspect, an embodiment of the present invention provides a non-transitory computer-readable storage medium, the non-transitory computer-readable storage medium storing computer executable instructions, and the computer executable instructions being configured to enable the UAV to perform the automatic return method described above.

In a fifth aspect, an embodiment of the present invention further provides a computer program product that includes a computer program stored in a non-transitory computer-readable storage medium, the computer program including program instructions that, when executed by a UAV, cause the UAV to perform the automatic return method described above.

The beneficial effects of the embodiments of the present invention are as follows. Different from the situation in the prior art, according to the automatic return method, apparatus and UAV provided in the embodiments of the present invention, the total power consumption for the UAV to return from the current position to the return point is estimated according to the return information and the environmental information (especially the information about a vertical air stream on the return route of the UAV), so as to determine the minimum power required for the UAV to return to the return point from the current position more intelligently and accurately. In addition, when the difference between the remaining battery level and the total power consumption of the UAV is less than or equal to the battery level threshold, the UAV is controlled to automatically return, so as to avoid forced landing of the UAV due to an excessively low battery level during a flight or a return, thus achieving safe return.

BRIEF DESCRIPTION OF THE DRAWINGS

To describe the technical solutions in the embodiments of the present invention more clearly, the following briefly describes the accompanying drawings required for describing the embodiments of the present invention. Obviously, the accompanying drawings in the following descriptions are merely some embodiments of the invention, and a person of ordinary skill in the art may further obtain other accompanying drawings according to the accompanying drawings without creative efforts.

DETAILED DESCRIPTION

Figure 1:
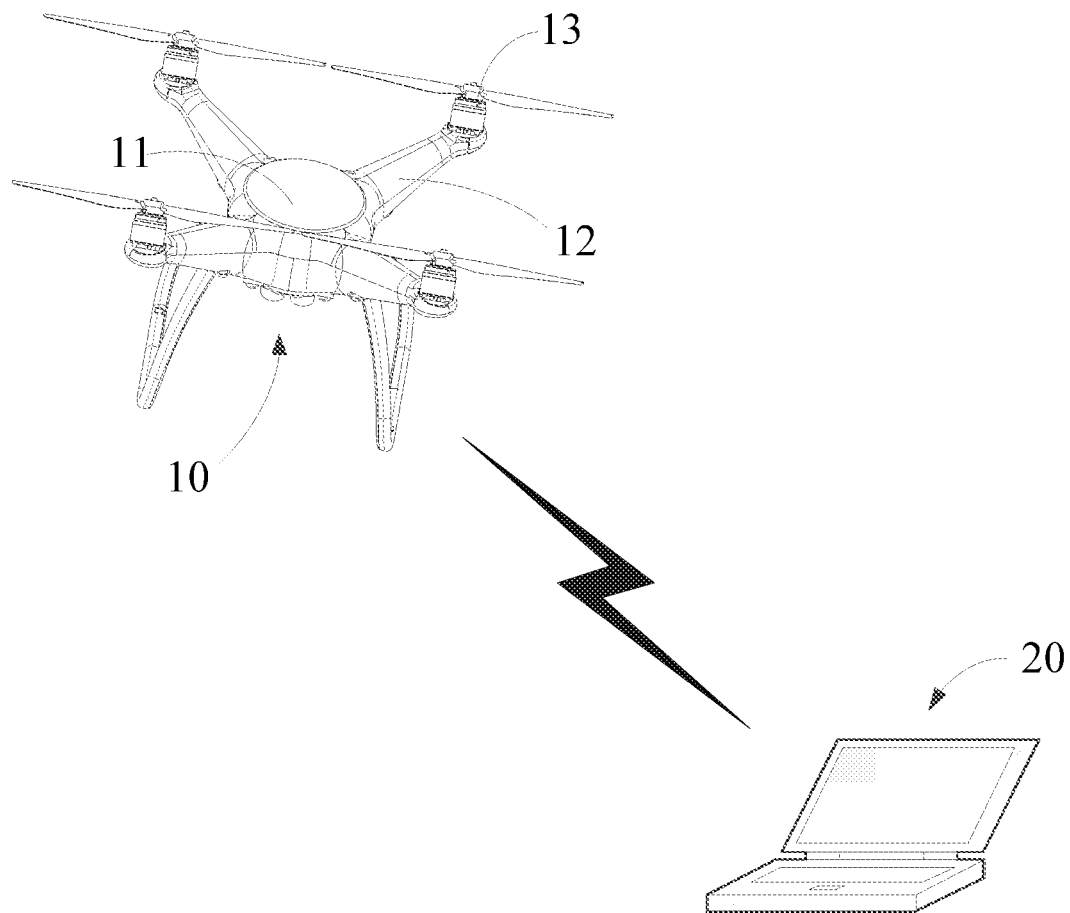
FIG. 1 is a schematic diagram of one of application environments of an automatic return method according to an embodiment of the present invention.

To make the objectives, technical solutions, and advantages of the present disclosure clearer and more comprehensible, the following further describes the present disclosure in detail with reference to the accompanying drawings and embodiments. It should be understood that the embodiments herein are provided for describing the present invention and not intended to limit the present invention.

It should be noted that, if no conflict occurs, features in the embodiments of the present invention may be combined with each other and fall within the protection scope of the present invention. In addition, although functional module division is performed in the schematic diagram of the apparatus, and a logical sequence is shown in the flowchart, in some cases, the shown or described steps may be performed by using module division different from the module division in the apparatus, or in a sequence different from the sequence in the flowchart.

At present, a minimum power to trigger the UAV to automatically return is mainly determined according to a return distance, a current flight speed and a current power consumption rate. The minimum power is sometimes not sufficient to support a safe return of the UAV, which may easily lead to forced landing due to an excessively low battery level of the UAV halfway.

The inventor found the reason that it is mainly because the UAV may be affected by environmental factors during the return, and in order to overcome the impact of environmental factors, it needs to consume additional power. In numerous environmental factors, the vertical air stream may cause turbulence of the UAV, which easily leads to flight difficulties, having obvious effects on the power consumption of the UAV during the return.

In view of this, the embodiments of the present invention provide an automatic return method, apparatus and UAV.

The automatic return method is a method for real-time detection of the minimum power consumption for the UAV to return from the current position to the return point and controlling the UAV to return automatically when a difference between the remaining battery level of the UAV and the minimum power consumption is less than or equal to a certain battery level threshold. In particular, in the embodiment of the present invention, the minimum power consumption is determined according to the return information of the UAV at the current position and the environmental information (especially the information about a vertical air stream) on the return route, which can comprehensively consider the impact of environmental factors on the return of the UAV, more accurately predict the minimum power consumption required by the UAV returning from the current position to the return point, and avoid the forced landing of the UAV during flight or returning due to the excessively low battery level.

The automatic return apparatus is a virtual apparatus composed of software programs that can implement the automatic return method provided in the embodiments of the present invention. The automatic return apparatus and the automatic return method provided in the embodiments of the present invention are based on the same inventive concept, and have the same technical features and beneficial effects.

The UAV may be any type of UAV, such as a fixed-wing UAV, a tilt-rotor UAV, a rotary-wing UAV, an umbrella-wing UAV, a flapping-wing UAV or the like. Any type of processor may be provided in the UAV, which can perform the automatic return method provided in the embodiment of the present invention or run the automatic return apparatus provided in the embodiment of the present invention.

The embodiments of the present invention are further described below with reference to the accompanying drawings.

FIG. 1 is a schematic diagram of one of application environments of an automatic return method according to an embodiment of the present invention. Referring to FIG. 1, the application environment includes a UAV 10 and a remote control terminal 20. The UAV 10 and the remote control terminal 20 may be wirelessly connected in any way, for example, by using the wireless fidelity technology (Wi-Fi), the Bluetooth technology or mobile communication technologies such as the 3rd Generation (3G), the 4th Generation (4G) or the 5th Generation (5G) to implement wireless connection, which is not limited herein.

Figure 2:
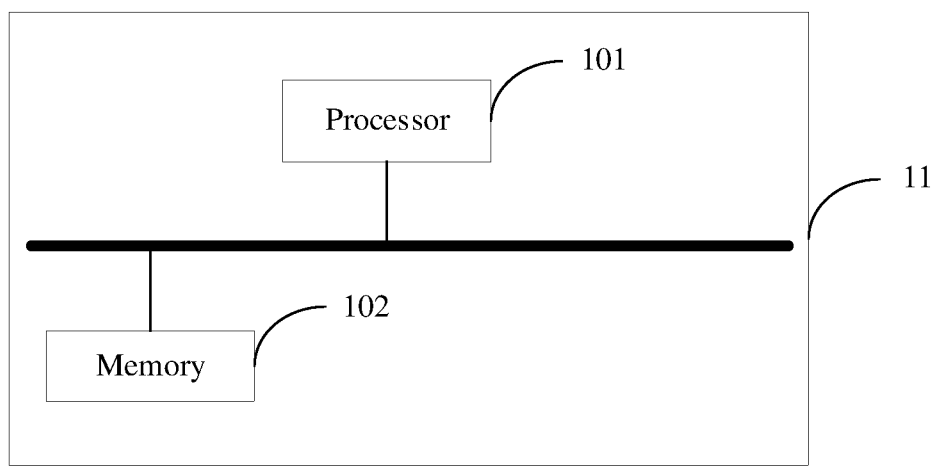
FIG. 2 is a schematic diagram of an inner structure of a UAV shown in FIG. 1.

The UAV 10 may specifically be a quadrotor UAV, which may include a body 11, an arm 12 connected to the body 11 and a power apparatus 13 mounted on the arm 12. The power apparatus 13 is configured to provide lift force or motive force for the UAV 10 to fly. Specifically, as shown in FIG. 2, the body 11 of the UAV 10 may be equipped with at least one processor 101 (one processor is given by way of example in FIG. 2) and a memory 102 that are communicatively connected through a system bus or other means.

The processor 101 is configured to provide computing and control capabilities to control the UAV 10 to fly and perform related tasks, for example, to control the UAV 10 to perform any of the automatic return methods provided in the embodiments of the present invention.

The memory 102, as a non-transitory computer-readable storage medium, may be configured to store a non-transitory software program, a non-transitory computer executable program and a module, such as a program instruction/module corresponding to the automatic return method in the embodiment of the present invention. The processor 101 may implement the automatic return method in any of the following method embodiments by running the non-transitory software program, an instruction and the module stored in the memory 102. Specifically, the memory 102 may include a high-speed random access memory, and may further include a non-transitory memory, such as at least one magnetic disk memory device, a flash memory device, or other non-transitory solid-state memory devices. In some embodiments, the memory 102 may further include memories remotely disposed relative to the processor 101, and the remote memories may be connected to the processor 101 through a network. Examples of the network include, but are not limited to, the Internet, an intranet, a local area network, a mobile communications network, and a combination thereof.

In addition, the remote control terminal 20 may be any terminal capable of controlling the UAV 10, for example, a remote control, a mobile terminal (for example, a smart phone, a tablet computer, a notebook computer or the like), a wearable device or other devices. The remote control terminal 20 may control, by sending control instructions to the UAV 10, the UAV 10 to adjust the flight attitude or perform corresponding tasks, or may receive signals or image data from the UAV 10. The remote control terminal 20 may further be equipped with a display screen for displaying images according to the image data.

In actual application, the UAV 10 may obtain current return information, environmental information and remaining battery level of the UAV 10 in real time during flight. The return information includes a return route, a return distance, a return acceleration pedal depression amount and a power consumption rate corresponding to the return acceleration pedal depression amount that are for the UAV to return from a current position to a return point. The environmental information includes information about a vertical air stream on the return route. Total power consumption of the UAV 10 returning from the current position to the return point is determined according to the return information and the environmental information. When a difference between the remaining battery level and the total power consumption is less than or equal to a battery level threshold, the UAV 10 is controlled to return automatically. When the UAV 10 automatically returns, a return message and/or a return picture may be sent to the remote control terminal 20 to notify a user that the UAV 10 automatically returns due to a battery warning.

It should be noted that, the above application environment is only for illustrative description. In practical application, the automatic return method and related apparatuses provided in the embodiments of the present invention may further be expanded to other suitable application environments and are not limited to the application environment shown in FIG. 1. For example, in some other embodiments, the UAV 10 may alternatively be other types of UAVs, such as a single rotor UAV, a six-rotor UAV, a tilt-rotor UAV, an umbrella-wing UAV, a flapping-wing UAV or the like. The number of the UAVs 10 and the remote control terminals 20 may also be more than one.

Figure 3:
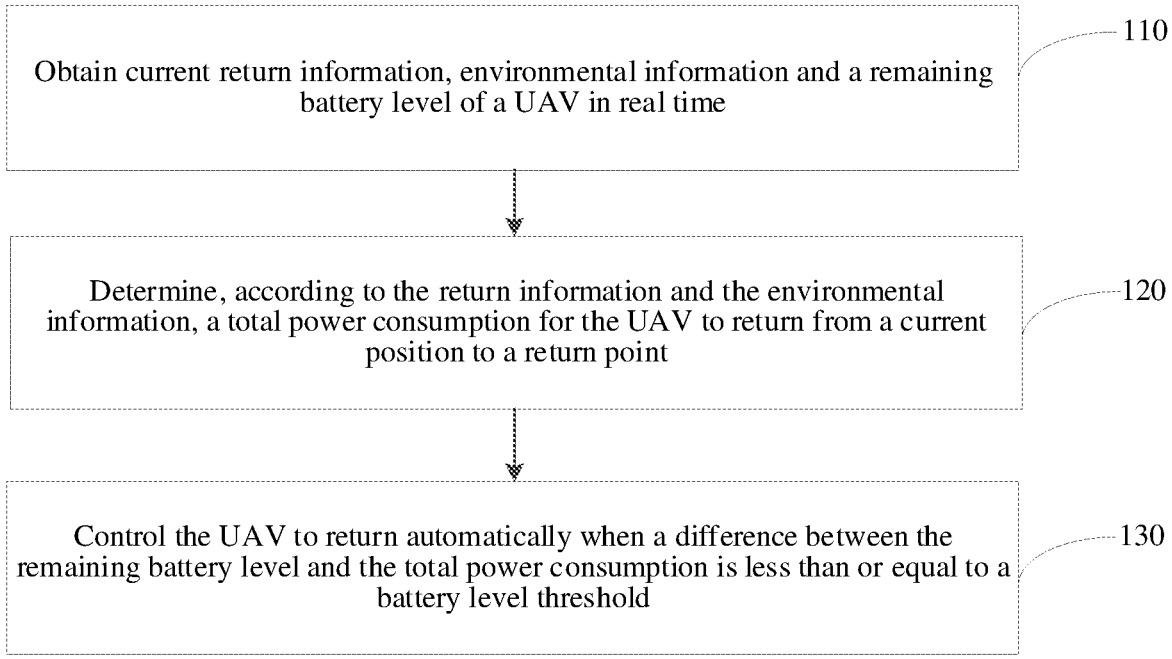
FIG. 3 is a schematic flowchart of the automatic return method according to an embodiment of the present invention.

FIG. 3 is a schematic flowchart of the automatic return method according to an embodiment of the present invention. The method may be performed by any type of UAV, for example, by the UAV 10 shown in FIG. 1.

Specifically, referring to FIG. 3, the method may include but is not limited to the following steps.

Step 110: Obtain current return information, environmental information and a remaining battery level of a UAV in real time.

In this embodiment, the "return information" refers to relevant flight information for the UAV to return from the current position to the return point, which may specifically include information such as a return route, a return distance, a return acceleration pedal depression amount, a power consumption rate corresponding to the return acceleration pedal depression amount and the like.

The "return point" refers to a position in which the UAV will return after a power warning, which may be an initial return point of the UAV, for example, a take-off point of the UAV or other designated locations, or may be a return point updated based on other conditions during the flight of the UAV, for example, the return point updated according to the position of the remote control terminal. This is not limited in the embodiment of the present invention. In addition, it is to be further noted that, in this embodiment, a height of the return point is also not specifically limited. For example, the return point may be on the same horizontal plane as the current position of the UAV, or may be on a different horizontal plane. The UAV will perform the landing task after returning to the return point.

The "return route" refers to a route of the UAV flying back to the return point from the current position, which may be calculated in real time based on the current position of the UAV and the return point. The embodiment of the present invention does not specifically limit the way to determine the return route.

The "return distance" refers to a distance traveled by the UAV to return to the return point from its current position according to the determined return route. For example, assuming that the return route determined by the UAV is to first ascend to a preset height and then return to the return point in a straight line, then the current return distance of the UAV is a distance the UAV has ascended plus a horizontal distance between the current position and the return point.

The "return acceleration pedal depression amount" refers to an amount of acceleration pedal depression for driving the UAV to fly during the return of the UAV, which may be a preset acceleration pedal depression amount, for example, return at the maximum acceleration pedal depression amount, or may be the current acceleration pedal depression amount of the UAV, which is not limited in the embodiment of the present invention either. Different return acceleration pedal depression amounts correspond to different power consumption rates. A larger return acceleration pedal depression amount corresponds to a faster power consumption rate.

Moreover, the "environmental information" refers to the environmental information on the route for the UAV to return from the current position to the return point, which may specifically include information about a vertical air stream on the return route. The "information about a vertical air stream" may include information such as whether a vertical air stream region exists, a range of the vertical air stream region, air stream strength and the like. The "vertical air stream" refers to air stream formed due to vertical movement of air, which may include ascending air stream (formed due to upward movement of air) and descending air stream (formed due to downward movement of air). If the UAV encounters vertical air stream during the flight, turbulence is usually generated, causing the UAV unable to fly stably and even causing explosion due to being out of control in severe cases. Therefore, when the UAV passes through the vertical air stream region, more power generally needs to be consumed.

In this embodiment, during the flight of the UAV, the return information, environmental information, and a remaining battery level for the UAV to return from the current position to the return point are obtained in real time, so as to monitor whether the UAV is in a low battery warning state. Both the return information and the remaining battery level can be obtained by processing data fed back from various hardware (such as various sensors, batteries and the like) of the UAV or related preset data. The information about a vertical air stream in the environmental information may be determined by obtaining meteorological data fed back by an external device (for example, a meteorological database or a remote control terminal).

In addition, in some embodiments, considering an influence of wind (that is, the air stream formed by air moving in the horizontal direction) on the actual flight speed of the UAV, in determining the return information of the UAV, a return angle of the UAV is further obtained, and a wind speed and a wind direction of an environment in which the UAV is located are further obtained in real time. The return angle may be determined based on the return route, and the wind speed and the wind direction may be detected in real time by a sensor mounted on the UAV.

Step 120: Determine, according to the return information and the environmental information, a total power consumption for the UAV to return from a current position to a return point.

In this embodiment, the total power consumption (or the minimum power consumption) for the UAV to return from the current position to the return point is estimated by comprehensively considering the return information and the environmental information.

Figure 4:
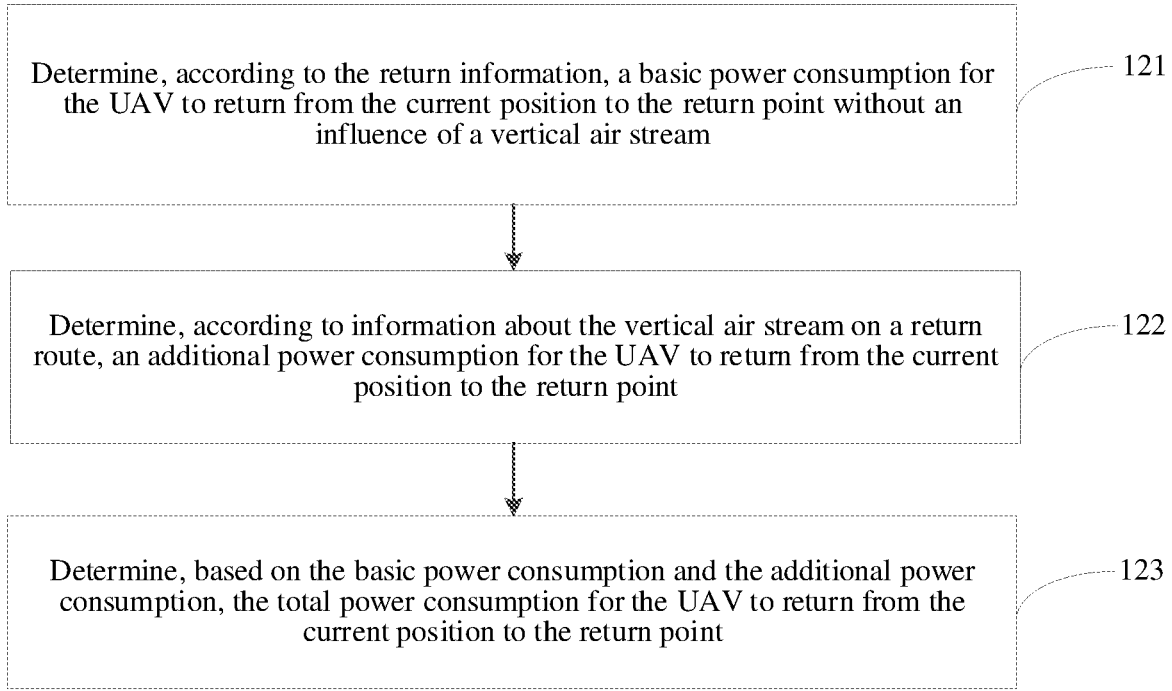
FIG. 4 is a schematic flowchart of a method for determining, according to return information and environmental information, a total power consumption for the UAV to return from a current position to a return point according to an embodiment of the present invention.

Specifically, as shown in FIG. 4, the specific implementation of step 120 may include but is not limited to the following steps.

Step 121: Determine, according to the return information, a basic power consumption for the UAV to return from the current position to the return point without an influence of the vertical air stream.

In this embodiment, the "basic power consumption" refers to the minimum power required for the UAV to fly back to the return point from the current position without the influence of any vertical air stream.

During specific implementation, in some embodiments, a flight speed of the UAV during the return may be first determined by using a return acceleration pedal depression amount, then the time required for returning is determined according to the return distance and the flight speed, and finally the basic power consumption for the UAV to return from the current position to the return point without the influence of the vertical air stream is determined according to the time required for returning and the power consumption rate corresponding to the return acceleration pedal depression amount.

In some other embodiments, in order to more accurately estimate the actual return speed of the UAV, the obtained return information further includes a return angle, and the obtained environmental information further includes the wind speed and the wind direction of the environment in which the UAV is located. Therefore, in this embodiment, the basic power consumption for the UAV to return from the current position to the return point without the influence of the vertical air stream may further be determined according to the wind speed, the wind direction and the return information.

Specifically, an actual return speed for the UAV to return from the current position to the return point in a windy environment may be determined first according to the return acceleration pedal depression amount, the return angle, the wind speed and the wind direction, and then the basic power consumption for the UAV to return from the current position to the return point without an influence of the vertical air stream is determined according to the actual return speed, the return distance and the power consumption rate corresponding to the return acceleration pedal depression amount.

A specific implementation of the determining, according to the return acceleration pedal depression amount, the return angle, the wind speed and the wind direction, an actual return speed for the UAV to return from the current position to the return point in a windy environment may be: first determining, according to the return acceleration pedal depression amount, an ideal return speed for the UAV to return to the return point from the current position in a windless environment (that is, a flight speed obtained by driving the UAV with the return acceleration pedal depression amount when there is no wind); and then determining, according to the ideal return speed, the return angle, the wind speed and the wind direction by using a pre-fitting calculation formula, the actual return speed for the UAV to return from the current position to the return point in a windy environment (that is, under the influence of wind, the actual flight speed that can be achieved by driving the UAV to fly with the return acceleration pedal depression amount). Alternatively, the actual flight speed of driving the UAV to fly in various directions with a predetermined return acceleration pedal depression amount in the same wind direction but at different wind speeds may be collected in advance, a correspondence between the return acceleration pedal depression amount, the return angle, the wind speed, the wind direction and the actual flight speed (that is, the actual return speed) is established, and the correspondence is pre-stored in the UAV. Therefore, in actual flight, the UAV can directly determine the actual flight speed of the UAV (that is, the actual return speed) based on the obtained return acceleration pedal depression amount, the return angle, the wind speed and the wind direction.

In addition, in some other embodiments, in order to ensure the flight safety of the UAV, a maximum return speed is set for the UAV. Assuming that the return acceleration pedal depression amount of the UAV may cause the UAV to reach the maximum return speed without an influence of wind, and the UAV goes downwind during the return, then if the UAV continues to be driven with the originally determined return acceleration pedal depression amount, the actual return speed of the UAV is bound to exceed the limited maximum return speed.

Therefore, in this embodiment, in order to meet flight safety requirements of the UAV, after the actual return speed for the UAV to return from the current position to the return point in a windy environment is determined, it is first determined whether the actual return speed is less than or equal to the maximum return speed. If so, the basic power consumption for the UAV to return from the current position to the return point without the influence of the vertical air stream is determined according to the actual return speed, the return distance and the power consumption rate corresponding to the return acceleration pedal depression amount, or if not, the return acceleration pedal depression amount of the UAV is redetermined according to the maximum return speed, the return angle, the wind speed and the wind direction, and the basic power consumption for the UAV to return from the current position to the return point without the influence of the vertical air stream is determined according to the maximum return speed, the return distance and a power consumption rate corresponding to the redetermined return acceleration pedal depression amount of the UAV.

In this embodiment, with full consideration of the impact of factors such as the return angle, the wind speed, the wind direction and the maximum return speed on the basic power consumption for the UAV to return from the current position to the return point without the influence of the vertical air stream, the minimum power required for the UAV to return from the current position can be more accurately estimated.

Step 122: Determine, according to the information about the vertical air stream on the return route, an additional power consumption for the UAV to return from the current position to the return point.

Since the vertical air stream has a greater impact on the flight of the UAV, if a vertical air stream region exists on the return route of the UAV, the power consumption of the UAV for returning is bound to be increased. Therefore, in this embodiment, the additional power consumption for the UAV to return from the current position to the return point is further determined according to the information about the vertical air stream on the return route. The "additional power consumption" may specifically be the minimum power required for the UAV to pass through the vertical air stream region on the return route.

Specifically, it may be first determined, according to the obtained information about a vertical air stream, whether a vertical air stream region exists on the return route; and if not, the additional power consumption for the UAV to return from the current position to the return point is determined to be 0; or if so, the additional power consumption for the UAV to return from the current position to the return point is determined according to a range and air stream strength of the vertical air stream region.

A specific implementation of the determining, according to a range and air stream strength of the vertical air stream region, the additional power consumption for the UAV to return from the current position to the return point may be: first determining, according to the range and the air stream strength of the vertical air stream region, a manner in which the UAV passes through the vertical air stream region, so as to determine, based on the manner in which the UAV passes through the vertical air stream region, the additional power consumption for the UAV to return from the current position to the return point.

For example, if the range of the vertical air stream region is relatively large and the air stream strength is relatively strong, in order to avoid the vertical air stream from causing damage to the UAV (for example, bombing), the vertical air stream region should be passed through in a detouring manner. At this point, the additional power consumption for the UAV to return to the return point from the current position is the power required for the UAV to detour.

For another example, if the range of the vertical air stream region is relatively small and the air stream strength is relatively weak, in order to return to the return point as quickly as possible, the UAV can directly pass through the vertical air stream region. At this point, the additional power consumption for the UAV to return to the return point from the current position is the power required for the UAV to directly pass through the vertical air stream region. However, values of the power may be determined by referring to an experimental data table established in advance.

Step 123: Determine, based on the basic power consumption and the additional power consumption, a total power consumption for the UAV to return from the current position to the return point.

In this embodiment, a sum of the basic power consumption and the additional power consumption may be directly used as the total power consumption for the UAV to return from the current position to the return point.

However, it is to be understood that, in this embodiment, the influence of environmental factors such as a vertical air stream, the wind speed and the wind direction on the return of the UAV is mainly considered, which is because these environmental factors have a relatively large and widespread impact on the power consumption of the return of the UAV. In some other embodiments, the impact of other environmental factors such as climate, temperatures, altitudes and other environmental factors on the power consumption of the UAV to return may further be comprehensively considered to determine the total power consumption for the UAV to return from the current position to the return point. Therefore, in this embodiment, the total power consumption for the UAV to return from the current position to the return point may also be greater than the sum of the basic power consumption and the additional power consumption.

Step 130: Control the UAV to return automatically when a difference between the remaining battery level and the total power consumption is less than or equal to a battery level threshold.

In this embodiment, the "battery level threshold" may be a fixed power value preset by a programmer or a user, or may be a variable that is updated in real time according to actual flight conditions. For example, in some embodiments, in order to ensure that the UAV can land safely, the battery level threshold may be greater than or equal to a minimum power required for the UAV to land.

In this embodiment, if the remaining battery level of the UAV is much greater than the total power consumption for the UAV to return from the current position to the return point, it indicates that the UAV still has enough power to perform the flight mission and the return, so as to continue to perform the flight mission at this point. However, when the difference between the remaining battery level and the total power consumption is less than or equal to the power, it indicates that the remaining battery level of the UAV is close to a critical value of a low power warning. In order to return safely, the UAV needs to be controlled to return automatically at this point.

By means of the above technical solutions, the beneficial effects of the embodiments of the present invention lie in that, according to the automatic return method provided in the embodiments of the present invention, the total power consumption for the UAV to return from the current position to the return point is estimated according to the return information and the environmental information (especially the information about a vertical air stream on the return route of the UAV), so as to determine the minimum power required for the UAV to return to the return point from the current position more intelligently and accurately. In addition, when the difference between the remaining battery level and the total power consumption of the UAV is less than or equal to the battery level threshold, the UAV is controlled to automatically return, so as to avoid forced landing of the UAV due to an excessively low battery level during a flight or a return, thus achieving safe return.

Figure 5:
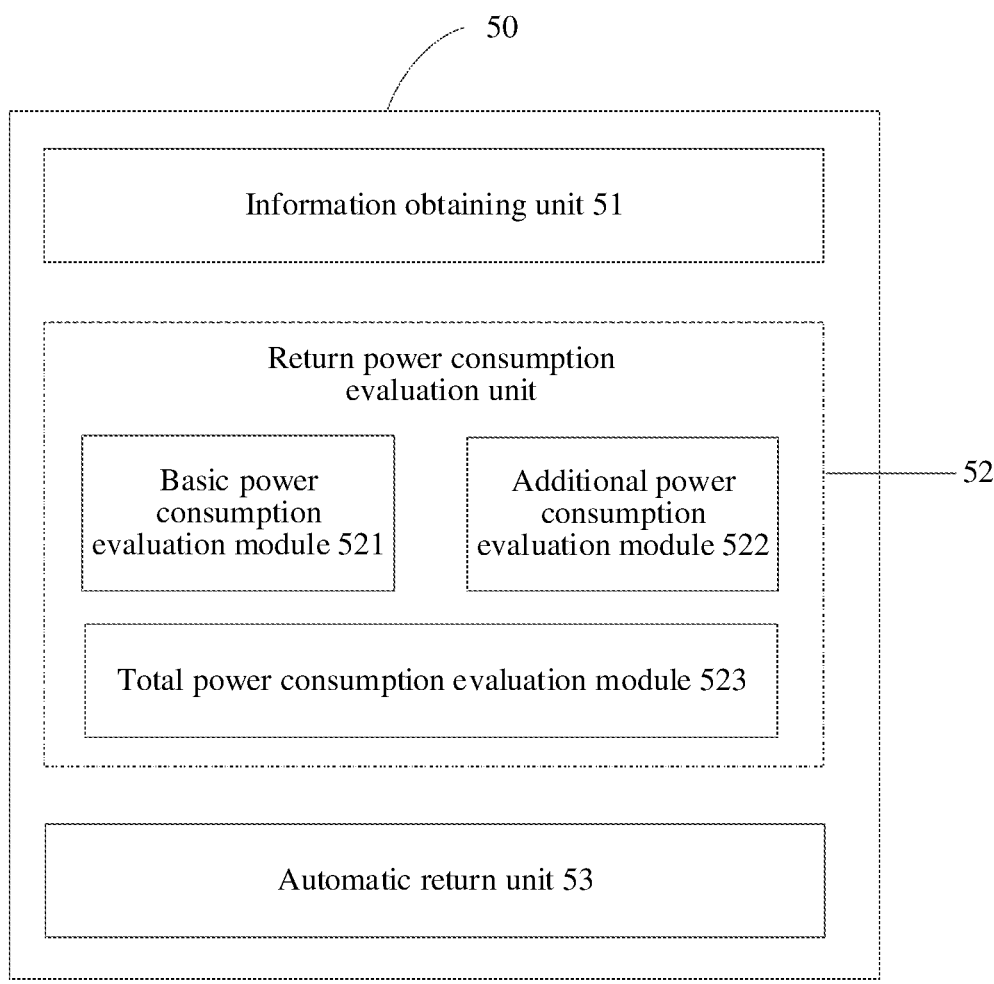
FIG. 5 is a schematic structural diagram of an automatic return apparatus according to an embodiment of the present invention.

FIG. 5 is a schematic structural diagram of an automatic return apparatus according to an embodiment of the present invention. The automatic return apparatus 50 may be run on any type of UAV (for example, the UAV 10 shown in FIG. 1).

Specifically, referring to FIG. 5, the apparatus 50 includes an information obtaining unit 51, a return power consumption evaluation unit 52 and an automatic return unit 53.

The information obtaining unit 51 is configured to obtain current return information, environmental information and a remaining battery level of the UAV in real time, where the return information includes a return route, a return distance, a return acceleration pedal depression amount and a power consumption rate corresponding to the return acceleration pedal depression amount that are for the UAV to return from a current position to a return point, and the environmental information includes information about a vertical air stream on the return route.

The return power consumption evaluation unit 52 is configured to determine, according to the return information and the environmental information, a total power consumption for the UAV to return from the current position to the return point.

The automatic return unit 53 is configured to control the UAV to return automatically when a difference between the remaining battery level and the total power consumption is less than or equal to a battery level threshold.

In this embodiment, during the flight of the UAV, current return information, environmental information and a remaining battery level of the UAV are obtained in real time by using the information obtaining unit 51. The return information includes a return route, a return distance, a return acceleration pedal depression amount and a power consumption rate corresponding to the return acceleration pedal depression amount that are for the UAV to return from a current position to a return point. The environmental information includes information about a vertical air stream on the return route. Total power consumption for the UAV to return from the current position to the return point is determined according to the return information and the environmental information by using the return power consumption evaluation unit 52. When a difference between the remaining battery level and the total power consumption is less than or equal to a battery level threshold, the UAV is controlled by using the automatic return unit 53 to return automatically.

In some embodiments, the return power consumption evaluation unit 52 includes a basic power consumption evaluation module 521, an additional power consumption evaluation module 522 and a total power consumption evaluation module 523.

The basic power consumption evaluation module 521 is configured to determine, according to the return information, a basic power consumption for the UAV to return from the current position to the return point without an influence of the vertical air stream. The additional power consumption evaluation module 522 is configured to determine, according to the information about the vertical air stream on the return route, an additional power consumption for the UAV to return from the current position to the return point. The total power consumption evaluation module 523 is configured to determine, based on the basic power consumption and the additional power consumption, the total power consumption for the UAV to return from the current position to the return point.

Specifically, in some embodiments, the return information further includes a return angle. The environmental information further includes a wind speed and a wind direction of an environment in which the UAV is located. The basic power consumption evaluation module 521 is specifically configured to determine, according to the wind speed, the wind direction and the return information, the basic power consumption for the UAV to return from the current position to the return point without the influence of the vertical air stream.

Further, in some embodiments, the basic power consumption evaluation module 521 is specifically configured to:

determine, according to the return acceleration pedal depression amount, the return angle, the wind speed and the wind direction, an actual return speed for the UAV to return from the current position to the return point in a windy environment; and determine, according to the actual return speed, the return distance and the power consumption rate corresponding to the return acceleration pedal depression amount, the basic power consumption for the UAV to return from the current position to the return point without an influence of the vertical air stream.

Alternatively, in some other embodiments, the return information further includes a maximum return speed, and the basic power consumption evaluation module 521 is specifically configured to:

determine, according to the return acceleration pedal depression amount, the return angle, the wind speed and the wind direction, an actual return speed for the UAV to return from the current position to the return point in a windy environment; determine whether the actual return speed is less than or equal to the maximum return speed; and if so, determine, according to the actual return speed, the return distance and the power consumption rate corresponding to the return acceleration pedal depression amount, the basic power consumption for the UAV to return from the current position to the return point without the influence of the vertical air stream; or if not, redetermine the return acceleration pedal depression amount of the UAV according to the maximum return speed, the return angle, the wind speed and the wind direction, and determine, according to the maximum return speed, the return distance and a power consumption rate corresponding to the redetermined return acceleration pedal depression amount of the UAV, the basic power consumption for the UAV to return from the current position to the return point without the influence of the vertical air stream.

In addition, in some embodiments, the additional power consumption evaluation module 522 is specifically configured to: determine, according to the information about the vertical air stream, whether a vertical air stream region exists on the return route; and if not, determine that the additional power consumption for the UAV to return from the current position to the return point is 0; or if so, determine, according to a range and air stream strength of the vertical air stream region, the additional power consumption for the UAV to return from the current position to the return point.

Furthermore, in some other embodiments, the battery level threshold is greater than or equal to a minimum power required for the UAV to land.

It should be noted that, since the automatic return apparatus and the automatic return method in the foregoing embodiment are based on the same inventive concept, the corresponding content of the foregoing method embodiment is also applicable to the apparatus embodiment, and the details are not described herein again.

By means of the above technical solutions, the beneficial effects of the embodiments of the present invention lie in that, according to the automatic return apparatus provided in the embodiments of the present invention, during the flight of the UAV, the information obtaining unit 51 obtains the current return information, environmental information and a remaining battery level of the UAV in real time, and the return power consumption evaluation unit 52 is used to estimate, according to the return information and the environmental information (especially the information about a vertical air stream on the return route of the UAV), a total power consumption for the UAV to return from the current position to the return point, so as to determine the minimum power required for the UAV to return to the return point from the current position more intelligently and accurately. In addition, when the difference between the remaining battery level and the total power consumption of the UAV is less than or equal to the battery level threshold, the automatic return unit 53 controls the UAV to automatically return, so as to avoid forced landing of the UAV due to an excessively low battery level during a flight or a return, thus achieving safe return.

The foregoing described device embodiments are merely examples. The units described as separate parts may or may not be physically separate and may be located in one position, or may be distributed on a plurality of network units. Some or all of the units or modules may be selected according to actual needs to achieve the objectives of the solutions of the embodiments.

The embodiments of the present invention further provide a non-transitory computer-readable storage medium, the non-transitory computer-readable storage medium storing computer executable instructions, and the computer executable instructions being executed by one or more processors, for example, one processor 101 in FIG. 2, so that the foregoing one or more processors perform the automatic return method in any of the foregoing method embodiments, for example, perform the foregoing described method steps 110 to 130 in FIG. 3 and steps 121 to 123 in FIG. 4.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by a UAV, the UAV may be enabled to execute the procedures of the foregoing method embodiments The storage medium may be a magnetic disk, an optical disc, a read-only memory (ROM), a RAM or the like.

For the foregoing product, the automatic return method provided in the embodiments of the present application may be performed, and the corresponding functional modules for performing the automatic return method and beneficial effects thereof are provided. For technical details not described in detail in this embodiment, reference may be made to the automatic return method provided in the embodiments of the present invention.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An automatic return method, applicable to an unmanned aerial vehicle (UAV), the method comprising:
obtaining current return information, environmental information and a remaining battery level of the UAV in real time, wherein the return information comprises a return route, a return distance, a return acceleration pedal depression amount and a power consumption rate corresponding to the return acceleration pedal depression amount for the UAV to return from a current position to a return point, and the environmental information comprises information about a vertical air stream on the return route;

determining, according to the return information and the environmental information, a total power consumption for the UAV to return from the current position to the return point; and controlling the UAV to return automatically when a difference between the remaining battery level and the total power consumption is less than or equal to a battery level threshold;

wherein the determining, according to the return information and the environmental information, a total power consumption for the UAV to return from the current position to the return point comprises:

determining, according to the return information, a basic power consumption for the UAV to return from the current position to the return point without an influence of the vertical air stream;

determining, according to the information about the vertical air stream on the return route, an additional power consumption for the UAV to return from the current position to the return point; and determining, based on the basic power consumption and the additional power consumption, the total power consumption for the UAV to return from the current position to the return point;

wherein the determining, according to the information about the vertical air stream on the return route, an additional power consumption for the UAV to return from the current position to the return point comprises:

determining, according to the information about the vertical air stream, whether a vertical air stream region exists on the return route; and in response to the vertical air stream does not exists, determining that the additional power consumption for the UAV to return from the current position to the return point is 0; or in response to the vertical air steam exists, determining, according to a range and an air stream strength of the vertical air stream region, the additional power consumption for the UAV to return from the current position to the return point.

2. The method according to claim 1, wherein the return information further comprises a return angle, and the environmental information further comprises a wind speed and a wind direction of an environment in which the UAV is located; and the determining, according to the return information, a basic power consumption for the UAV to return from the current position to the return point without an influence of the vertical air stream comprises:

determining, according to the wind speed, the wind direction and the return information, the basic power consumption for the UAV to return from the current position to the return point without the influence of the vertical air stream.

3. The method according to claim 2, wherein the determining, according to the wind speed, the wind direction and the return information, the basic power consumption for the UAV to return from the current position to the return point without the influence of the vertical air stream comprises:

determining, according to the return acceleration pedal depression amount, the return angle, the wind speed and the wind direction, an actual return speed for the UAV to return from the current position to the return point in a windy environment; and determining, according to the actual return speed, the return distance and the power consumption rate corresponding to the return acceleration pedal depression amount, the basic power consumption for the UAV to return from the current position to the return point without the influence of the vertical air stream.

4. The method according to claim 2, wherein the return information further comprises a maximum return speed, and the determining, according to the wind speed, the wind direction and the return information, the basic power consumption for the UAV to return from the current position to the return point without the influence of the vertical air stream comprises:

determining, according to the return acceleration pedal depression amount, the return angle, the wind speed and the wind direction, an actual return speed for the UAV to return from the current position to the return point in a windy environment;

determining whether the actual return speed is less than or equal to the maximum return speed; and in response to the actual turn speed is less than or equal to the maximum return speed, determining, according to the actual return speed, the return distance and the power consumption rate corresponding to the return acceleration pedal depression amount, the basic power consumption for the UAV to return from the current position to the return point without the influence of the vertical air stream; or in response to the actual turn speed is not less than or equal to the maximum return speed, redetermining the return acceleration pedal depression amount of the UAV according to the maximum return speed, the return angle, the wind speed and the wind direction, and determining, according to the maximum return speed, the return distance and a power consumption rate corresponding to the redetermined return acceleration pedal depression amount of the UAV, the basic power consumption for the UAV to return from the current position to the return point without the influence of the vertical air stream.

5. The method according to claim 1, wherein the battery level threshold is greater than or equal to a minimum battery level required for the UAV to land.

6. An automatic return apparatus, applicable to a UAV, the apparatus comprising:

a processor, configured to:

obtain current return information, environmental information and a remaining battery level of the UAV in real time, wherein the return information comprises a return route, a return distance, a return acceleration pedal depression amount and a power consumption rate corresponding to the return acceleration pedal depression amount for the UAV to return from a current position to a return point, and the environmental information comprises information about a vertical air stream on the return route;

determine, according to the return information and the environmental information, a total power consumption for the UAV to return from the current position to the return point; and control the UAV to return automatically when a difference between the remaining battery level and the total power consumption is less than or equal to a battery level threshold;

wherein the processor is further configured to:

determine, according to the return information, a basic power consumption for the UAV to return from the current position to the return point without an influence of the vertical air stream;

determine, according to the information about the vertical air stream on the return route, an additional power consumption for the UAV to return from the current position to the return point; and determine, based on the basic power consumption and the additional power consumption, the total power consumption for the UAV to return from the current position to the return point;

wherein the processor is specifically configured to:

determine, according to the information about the vertical air stream, whether a vertical air stream region exists on the return route; and in response to the vertical air stream region exists on the return route, determine that the additional power consumption for the UAV to return from the current position to the return point is 0; or in response to the vertical air stream region does not exist on the return route, determine, according to a range and an air stream strength of the vertical air stream region, the additional power consumption for the UAV to return from the current position to the return point.

7. The apparatus according to claim 6, wherein the return information further comprises a return angle, and the environmental information further comprises a wind speed and a wind direction of an environment in which the UAV is located; and the processor is specifically configured to:

determine, according to the wind speed, the wind direction and the return information, the basic power consumption for the UAV to return from the current position to the return point without the influence of the vertical air stream.

8. The apparatus according to claim 7, wherein the processor is specifically configured to:

determine, according to the return acceleration pedal depression amount, the return angle, the wind speed and the wind direction, an actual return speed for the UAV to return from the current position to the return point in a windy environment; and determine, according to the actual return speed, the return distance and the power consumption rate corresponding to the return acceleration pedal depression amount, the basic power consumption for the UAV to return from the current position to the return point without the influence of the vertical air stream.

9. The apparatus according to claim 7, wherein the return information further comprises a maximum return speed, and the processor is specifically configured to:

determine, according to the return acceleration pedal depression amount, the return angle, the wind speed and the wind direction, an actual return speed for the UAV to return from the current position to the return point in a windy environment;

determine whether the actual return speed is less than or equal to the maximum return speed; and in response to the actual return speed is less than or equal to the maximum return speed, determine, according to the actual return speed, the return distance and the power consumption rate corresponding to the return acceleration pedal depression amount, the basic power consumption for the UAV to return from the current position to the return point without the influence of the vertical air stream; or in response to the actual return speed is not less than or equal to the maximum return speed, redetermine the return acceleration pedal depression amount of the UAV according to the maximum return speed, the return angle, the wind speed and the wind direction, and determine, according to the maximum return speed, the return distance and a power consumption rate corresponding to the redetermined return acceleration pedal depression amount of the UAV, the basic power consumption for the UAV to return from the current position to the return point without the influence of the vertical air stream.

10. The apparatus according to claim 6, wherein the battery level threshold is greater than or equal to a minimum battery level required for the UAV to land.

11. A UAV, comprising:

a body;

an arm connected to the body;

a power apparatus disposed on the arm and configured to provide lift force or motive force for the UAV to fly;

at least one processor disposed on the body; and a memory communicatively connected to the at least one processor, wherein the memory stores instructions executable by the at least one processor, the instructions, when executed by the at least one processor, causing the at least one processor to:

obtain current return information, environmental information and a remaining battery level of the UAV in real time, wherein the return information comprises a return route, a return distance, a return acceleration pedal depression amount and a power consumption rate corresponding to the return acceleration pedal depression amount for the UAV to return from a current position to a return point, and the environmental information comprises information about a vertical air stream on the return route;

determine, according to the return information and the environmental information, a total power consumption for the UAV to return from the current position to the return point; and control the UAV to return automatically when a difference between the remaining battery level and the total power consumption is less than or equal to a battery level threshold;

wherein the processor is further configured to:

determine, according to the return information, a basic power consumption for the UAV to return from the current position to the return point without an influence of the vertical air stream;

determine, according to the information about the vertical air stream on the return route, an additional power consumption for the UAV to return from the current position to the return point; and determine, based on the basic power consumption and the additional power consumption, the total power consumption for the UAV to return from the current position to the return point;

wherein the processor is specifically configured to:

determine, according to the information about the vertical air stream, whether a vertical air stream region exists on the return route; and in response to the vertical air stream region exists on the return route, determine that the additional power consumption for the UAV to return from the current position to the return point is 0; or in response to the vertical air stream region does not exist on the return route, determine, according to a range and an air stream strength of the vertical air stream region, the additional power consumption for the UAV to return from the current position to the return point.

12. A non-transitory computer-readable storage medium, storing computer-executable instructions used for causing a UAV to:
- obtain current return information, environmental information and a remaining battery level of the UAV in real time, wherein the return information comprises a return route, a return distance, a return acceleration pedal depression amount and a power consumption rate corresponding to the return acceleration pedal depression amount for the UAV to return from a current position to a return point, and the environmental information comprises information about a vertical air stream on the return route;
- determine, according to the return information and the environmental information, a total power consumption for the UAV to return from the current position to the return point; and
- control the UAV to return automatically when a difference between the remaining battery level and the total power consumption is less than or equal to a battery level threshold;
- wherein the processor is further configured to:
- determine, according to the return information, a basic power consumption for the UAV to return from the current position to the return point without an influence of the vertical air stream;
- determine, according to the information about the vertical air stream on the return route, an additional power consumption for the UAV to return from the current position to the return point; and
- determine, based on the basic power consumption and the additional power consumption, the total power consumption for the UAV to return from the current position to the return point;
- wherein the processor is specifically configured to:
- determine, according to the information about the vertical air stream, whether a vertical air stream region exists on the return route; and
- in response to the vertical air stream region exists on the return route, determine that the additional power consumption for the UAV to return from the current position to the return point is 0; or
- in response to the vertical air stream region does not exist on the return route, determine, according to a range and an air stream strength of the vertical air stream region, the additional power consumption for the UAV to return from the current position to the return point.

* * * * *